United States Patent
Fan

(10) Patent No.: US 7,549,655 B2
(45) Date of Patent: Jun. 23, 2009

(54) SCOOTER

(76) Inventor: Jeeng-Neng Fan, No. 34, Alley 10, Lane 54, Sec. 2, Yangsin Rd., Yang mei, Taoyuan (TW)

(*) Notice: Subject to any disclaimer, the term of this patent is extended or adjusted under 35 U.S.C. 154(b) by 218 days.

(21) Appl. No.: 11/699,464

(22) Filed: Jan. 30, 2007

(65) Prior Publication Data

US 2008/0179849 A1 Jul. 31, 2008

(51) Int. Cl.
*B62M 1/12* (2006.01)
(52) U.S. Cl. .............................. 280/87.041; 280/87.05
(58) Field of Classification Search .............. 280/87.05, 280/87.041, 87.042, 40, 651, 220, 282; 438/113, 438/462, 463
See application file for complete search history.

(56) References Cited

U.S. PATENT DOCUMENTS

| | | | | |
|---|---|---|---|---|
| 4,088,338 A * | 5/1978 | Winchell et al. | ............. | 280/220 |
| 4,540,192 A * | 9/1985 | Shelton | ....................... | 280/282 |
| 5,039,121 A * | 8/1991 | Holter | ........................ | 280/220 |
| 5,328,193 A * | 7/1994 | Shiew | ................... | 280/87.041 |
| 6,220,612 B1 * | 4/2001 | Beleski, Jr. | ............ | 280/87.041 |
| 6,485,039 B1 * | 11/2002 | Ming-Fu | ................. | 280/87.041 |
| 6,499,751 B1 * | 12/2002 | Beleski, Jr. | ............ | 280/87.041 |
| 6,517,093 B2 * | 2/2003 | Feng | ..................... | 280/87.042 |
| 6,554,302 B1 * | 4/2003 | Liu | ........................ | 280/87.041 |
| 6,719,310 B1 * | 4/2004 | Lin | ........................ | 280/87.041 |
| 6,827,358 B2 * | 12/2004 | Beleski, Jr. | ............ | 280/87.041 |
| 6,883,814 B2 * | 4/2005 | Chuang | ................. | 280/87.041 |
| 6,908,091 B2 * | 6/2005 | Chuang | ................. | 280/87.041 |
| 6,976,687 B2 * | 12/2005 | Beleski, Jr. | ............ | 280/87.041 |
| 7,138,297 B2 * | 11/2006 | Iijima et al. | ................. | 438/113 |

* cited by examiner

*Primary Examiner*—Hau V Phan
(74) *Attorney, Agent, or Firm*—Rosenberg, Klein & Lee

(57) ABSTRACT

A scooter with one free-swaying rear-wheel set respectively located at rear end of the two fixed holding rods. The rear-wheel sets can sway freely to make the two rear wheels move leftward and rightward; hence, when operator's feet exert strength on said two fixed holding rods, the two rear wheels will be driven to move forward like S-shaped pathway. Moreover, through the coordination of the front wheel, stand rod and handle, the operator will be able to practice different car-driving actions of turning the body, hips and hands around, and different strength-exerting ways, such as by twisting one foot or two feet synchronously. Therefore, the operation of a scooter has the effect of being simple, having the feature of both fun and recreation.

3 Claims, 12 Drawing Sheets

SCOOTER

BACKGROUND OF THE INVENTION

1. Field of the Invention

The present invention relates to an improved scooter, especially with free-swaying rear-wheel set respectively located at the rear end of the fixed holding rods. By making use of the rear wheel of said left and right rear-wheel sets that can sway leftward or rightward to move forward like a S-shaped pathway when the operator's feet exert strength on said two holding rods. Hence, by means of the coordination of the front wheel, the stand rod and handle, operator will be able to practice actions of turning the body, bottom and hands around, and also conduct different strength-exerting ways, e.g. twisting foot by foot or two feet synchronously. In addition, this is a physical exercising sport with fun and recreation.

2. Description of the Related Arts

The design of a conventional scooter with triangular-shaped attachments is mostly made resembling the illustrations as shown on FIGS. 1 and 2; wherein, image on FIG. 1 is fixing front ends of left and right holding rods 10 on frame 1 via connector 11; a stand rod 20 is pivotally set on frame 1; handle 21 is set on upper end of stand rod 20; a front wheel is fitted on lower end of stand rod 20 via front fork 22; in addition, treadle 12 and rear wheel 13 are respectively fitted on the rear end of left and right holding rods. Upon operating, operator's feet stand on left and right treadles 12 and his hands hold handle 21; sway stand rod 20 leftward and rightward by turning around handle 21 or twisting body, front wheel 23 will then be driven to sway leftward and rightward and move forward at a S-shaped pathway; hence, the whole scooter will be able to scoot and move under the coefficient movement of the two rear wheels 13; the effect of exercising and physical training will be achieved. Since the movement of scooter is mainly generated by using the driving force created by the reciprocal leftward-swaying and right-swaying actions of front wheel 23, the two rear wheels 13 that cannot sway are only confined for providing a supplemental effect to assist moving. Moreover, the sway action of said front wheel 23 can only be dependent on the sway action of stand rod 20. Therefore, the operation is found to have the disadvantages of being difficult to operate, laborious, un-smooth, and even will create the feeling of frustration and boringness.

FIG. 2 shows that front ends of said two holding rods 10, via pivot pipe 101, can be pivotally fitted on frame 1 resembling the shape of being folded inward and unfolded outward; stand rod 20 is pivotally set on the front end of frame 1; handle 21 and front wheel 23 are respectively set on the upper end and lower end of stand rod 20; in addition, treadles 12 are fitted on said two holding rods respectively, and rear-wheel sets 30 are respectively fitted on the rear end of said two holding rods; wherein, a rear wheel 302 is set on the rear fork 301 of said rear-wheel set 30; the upper end of said rear fork 301 is pivotally fitted on the rear end of said holding rod 10 vertically, via pivot pipe 3011; the lower end of said rear fork 301 is dragged to said holding rod 10 by a flexible component 303, via extended plate 3012, to make rear fork 301 and rear wheel 302 have reciprocal flexibility of rendering guidance for returning at any time. Upon operation, the operator stretches his feet that were resting on the treadle to move outward synchronously and retract his feet to close inward; upon the actions of said two holding rods to move inward and outward alternately and continuously, said two rear-wheel sets 30 will be driven to sway to make rear wheel 302 move forward at a S-shaped pathway. Hence, the effect of moving scooter forward to exercise activate feet will be performed. As aforesaid described, when the operator operates treadles 12 to activate open and close motion with his feet (shown as FIG. 3 and FIG. 4), since pivot pipe 3011 of the said pivotally rear fork 301 is fitted vertically, automatically returning actions cannot be proceeded. Therefore, for enabling rear-wheel set 30 to be driven to sway, flexible component 303 is used to enforce the reciprocal actions. The method to move feet outward and inward synchronously to drive said two holding rods 10 to move inward and outward to make the scooter move forward can improve the disadvantage of being unemotional and un-swaying of the holding rods and two rear wheels (shown as FIG. 1), but there are disadvantages, such as un-smooth strength-exerting, un-harmonious or even un-elegant posture and upon turning a corner, feet are easy to over stretch outward. Moreover, the reciprocal actions enforced on rear-wheel set 30 and caused by flexible component 303 will also increase resistance of driving on rear wheel 302, and may affect the scooter's scooting speed and smoothness.

SUMMARY OF THE INVENTION

The major purpose of the present invention is to improve a scooter; wherein, the front ends of said two holding rods is designed in a fixed setting, and a freely swaying rear-wheel set is respectively located at rear end of said two holding rods. When operator's feet exert strength on the treadle of said holding rod, the said two rear wheels can be driven to move forward as S-shaped pathway. Furthermore, by means of coordination of the front wheel, stand rod and handle, the operator will be able to practice different car-driving actions of turning body, hips and hands around, and different strength-exerting ways, e.g. moving foot by foot or two feet synchronously. Therefore, the operation of scooter has the effect of being simple, fun and recreation.

The other purpose of the present invention is to improve a scooter; wherein, by means of the reciprocal free-sway action of the rear-wheel sets at said two holding rods, the two rear wheels will move more smoothly to make the scooter move more smoothly as well.

BRIEF DESCRIPTION OF THE DRAWINGS

Other features and advantages of the present invention will become apparent in the following detailed description of the preferred embodiments, with reference to the accompanying drawings, in which.

DETAILED DESCRIPTION OF THE PREFERRED EMBODIMENTS

Figure 1:
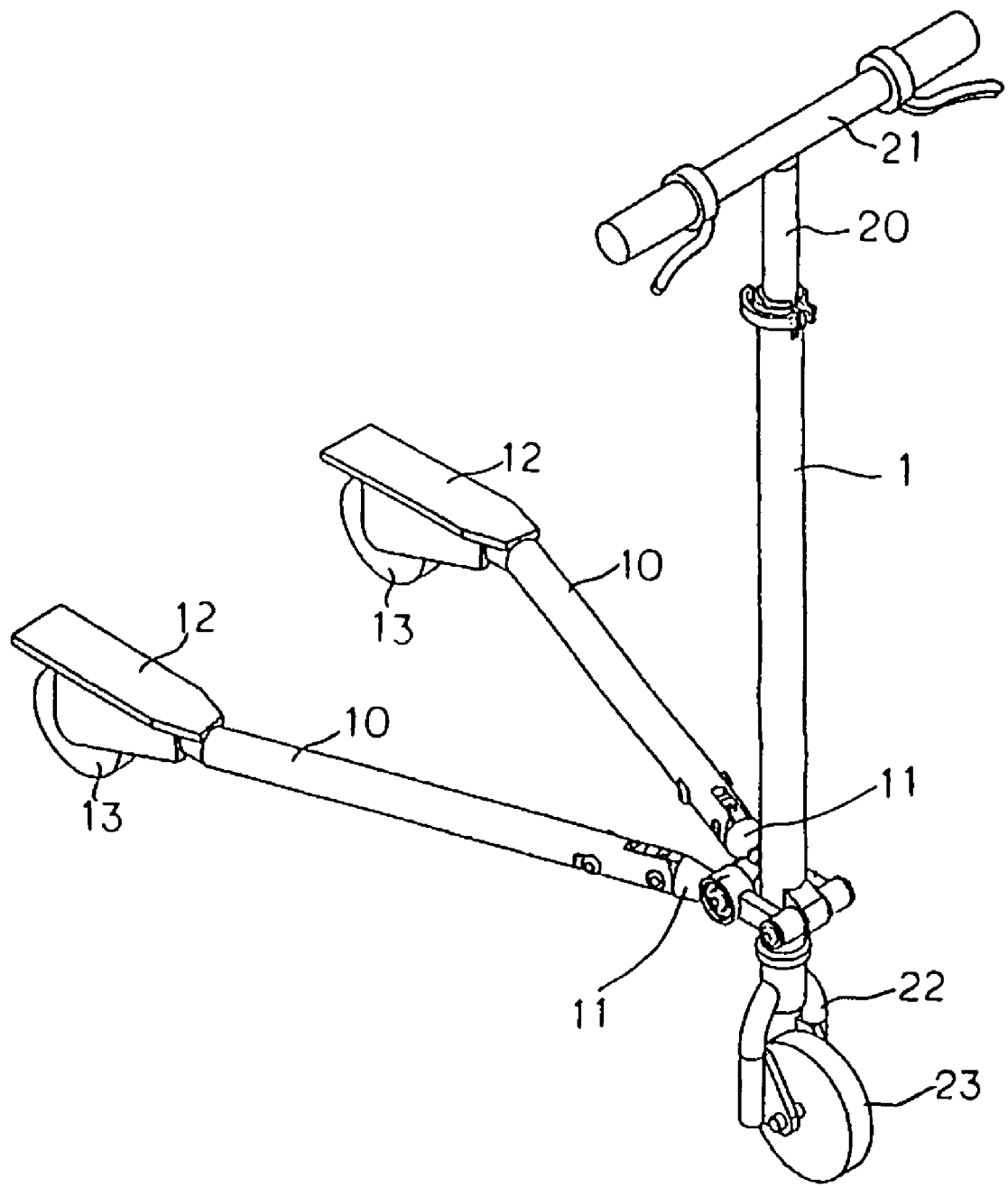
FIG. 1 is a 3-D schematic view of a conventional scooter (1).
Figure 2:
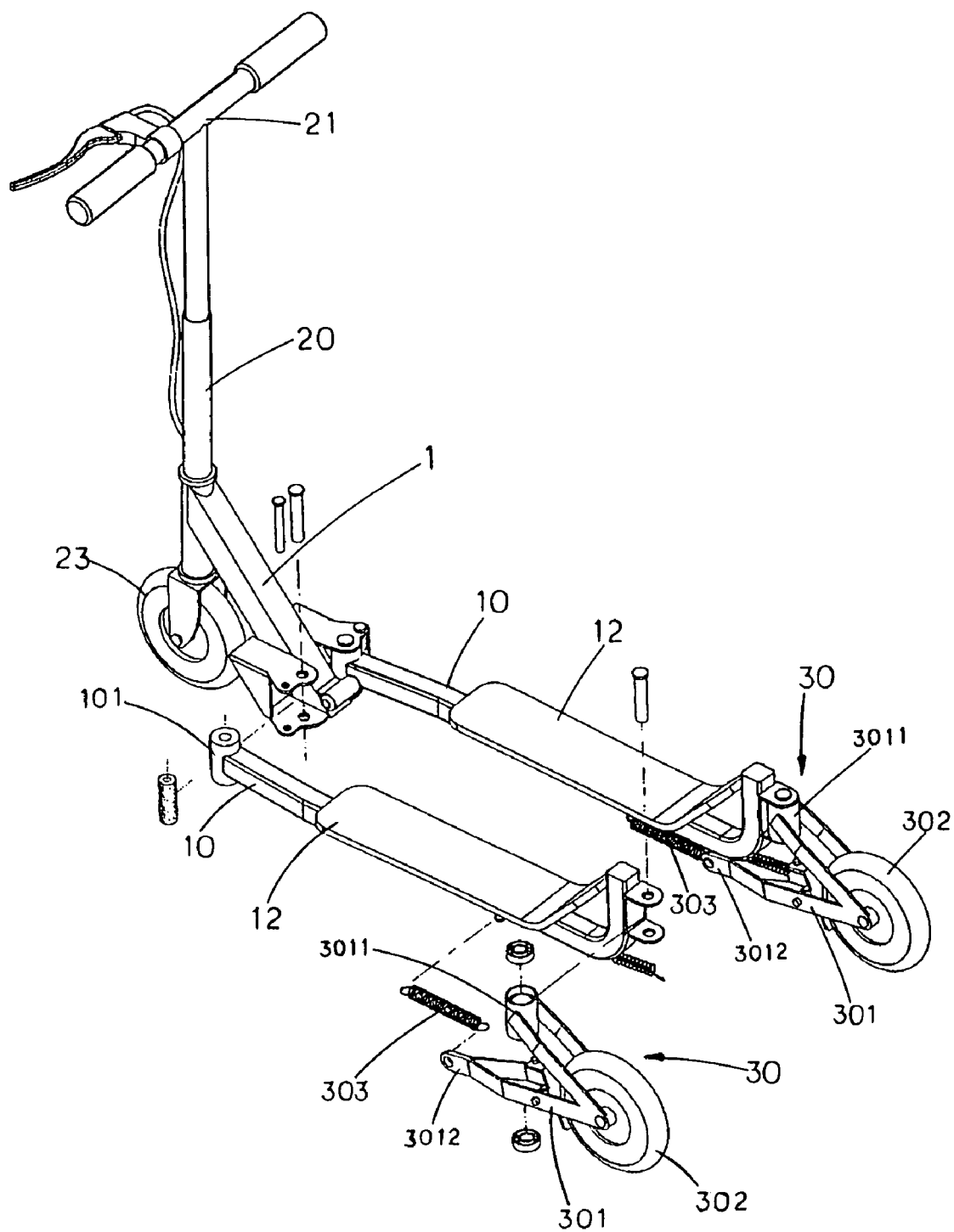
FIG. 2 is a 3-D schematic view of a conventional scooter (2).
Figure 3:
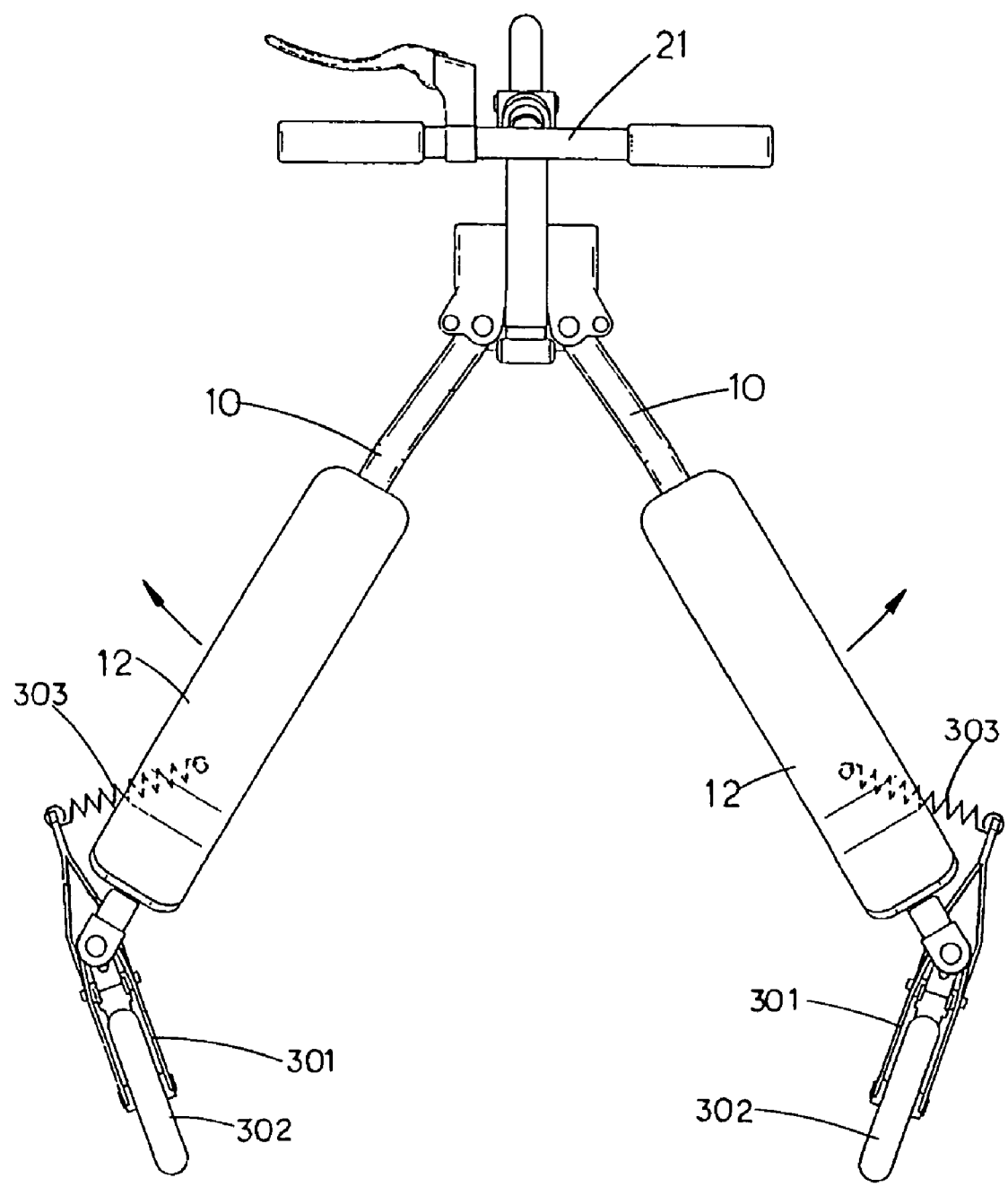
FIG. 3 is a schematic view (1) of operation status of FIG. 2.
Figure 4:
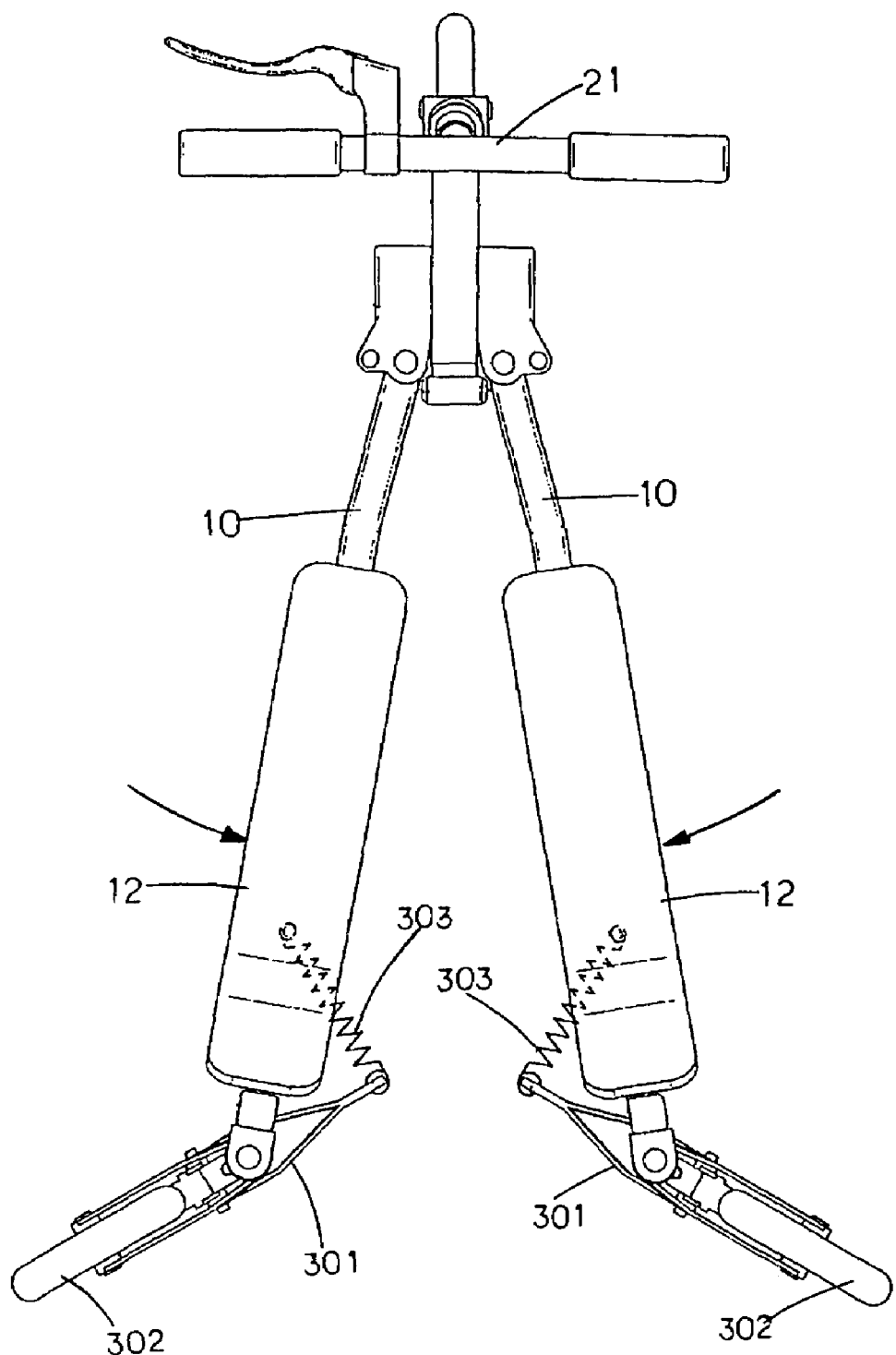
FIG. 4 is a schematic view (2) of operation status of FIG. 2.

In the detailed description of the preferred embodiments, it should be noted that like elements are indicated by the same reference numerals throughout the disclosure.

Figure 5:
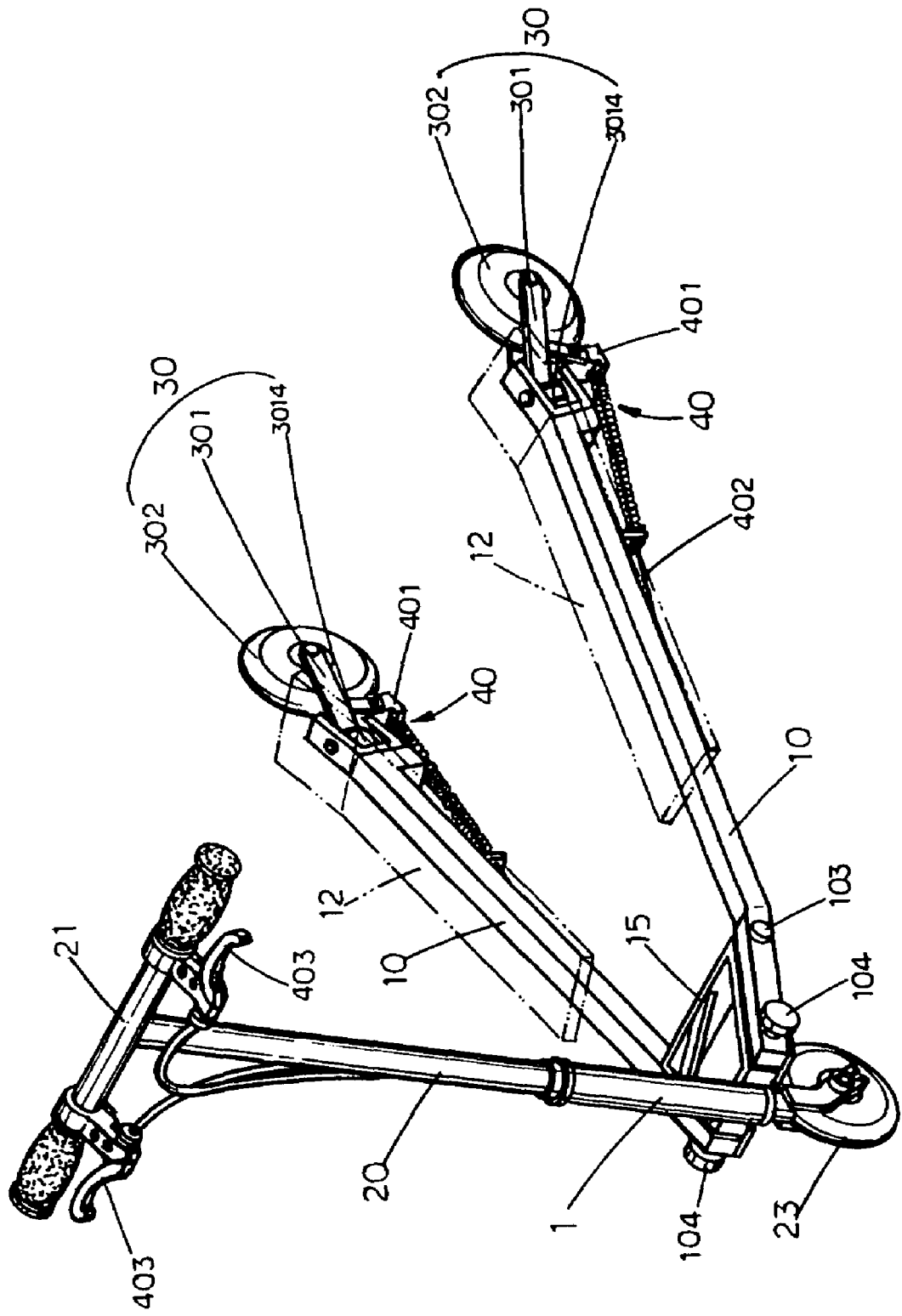
FIG. 5 is a 3-D schematic view of the present invention preferred embodiments.
Figure 6:
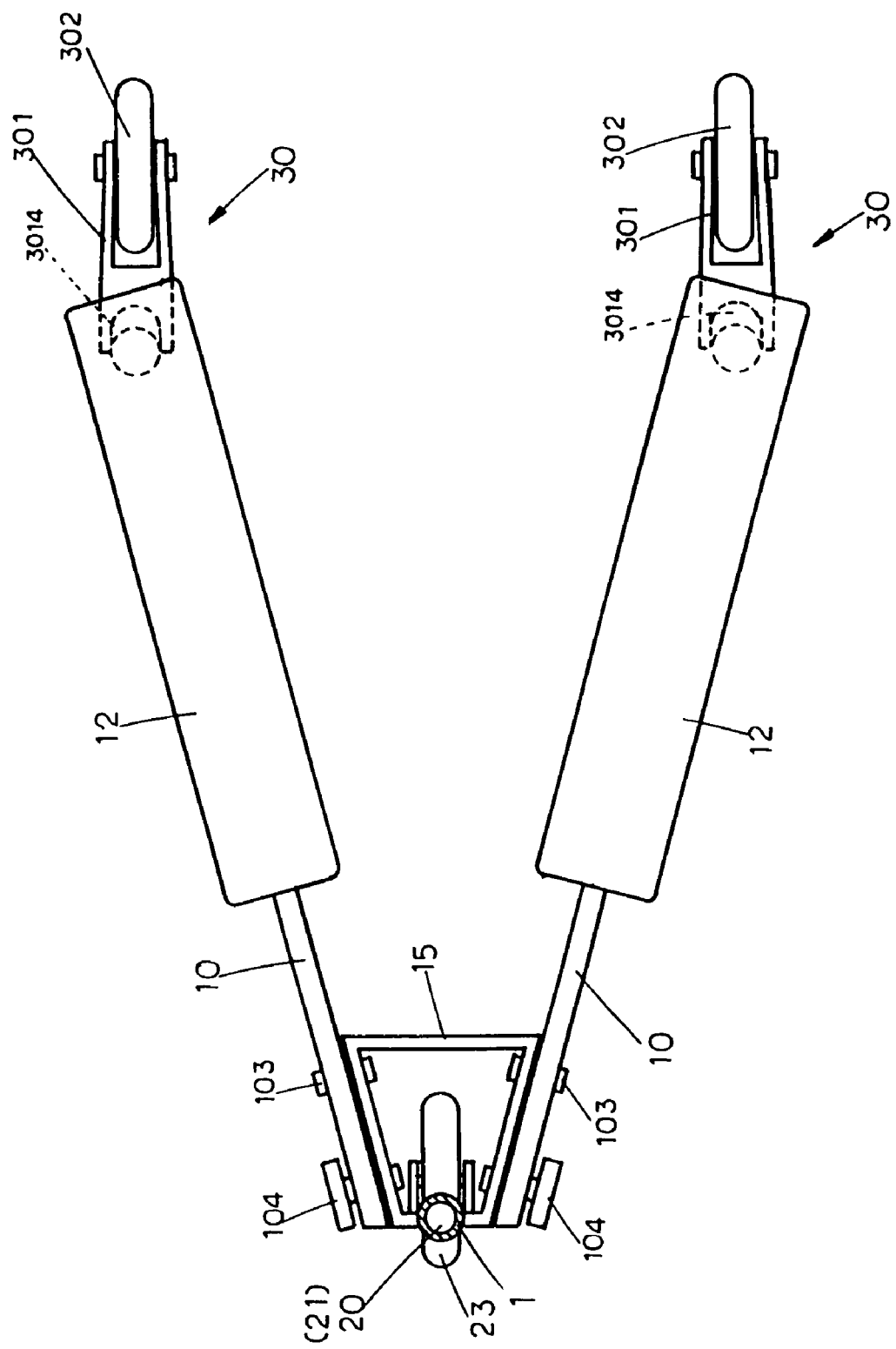
FIG. 6 is a vertical schematic view of FIG. 5.
Figure 7:
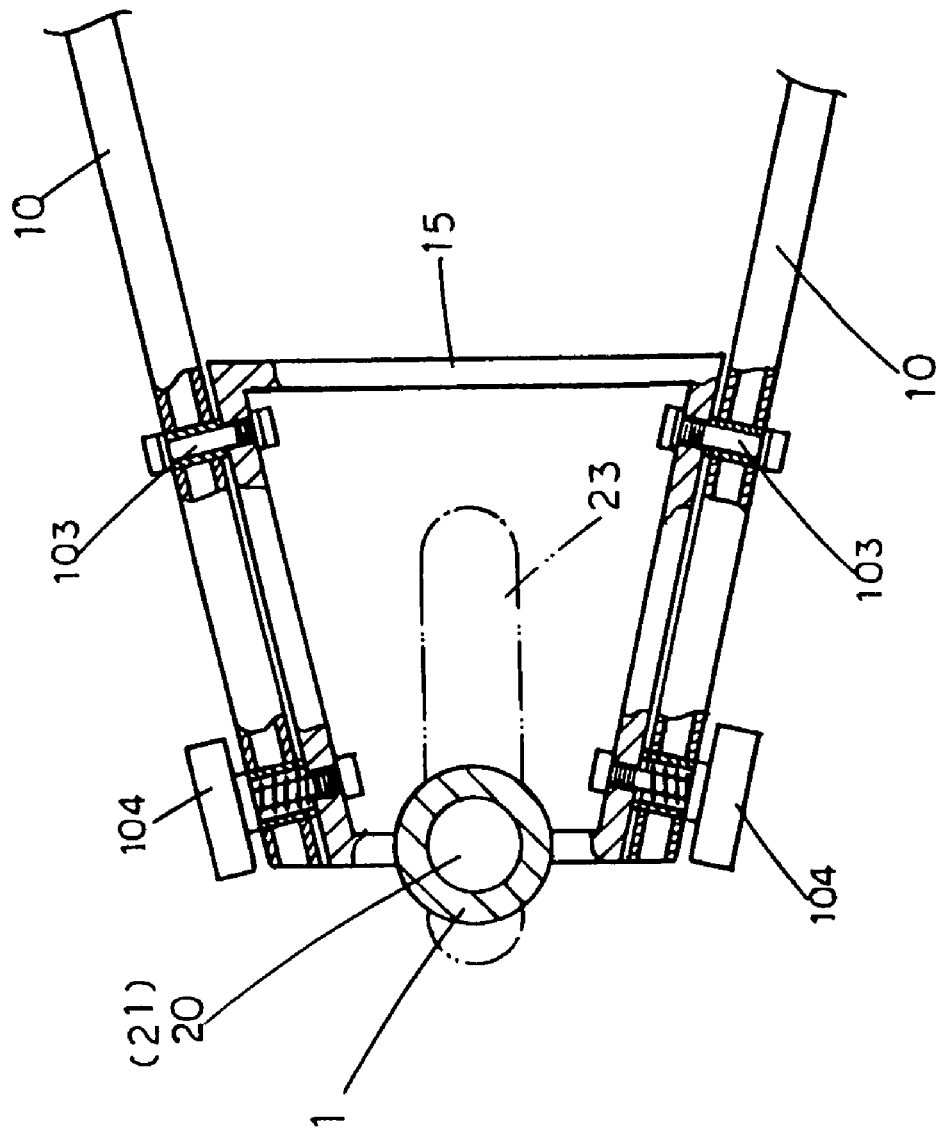
FIG. 7 is a vertical schematic view of the holding rod getting united with the positioning rack of the frame.
Figure 8:
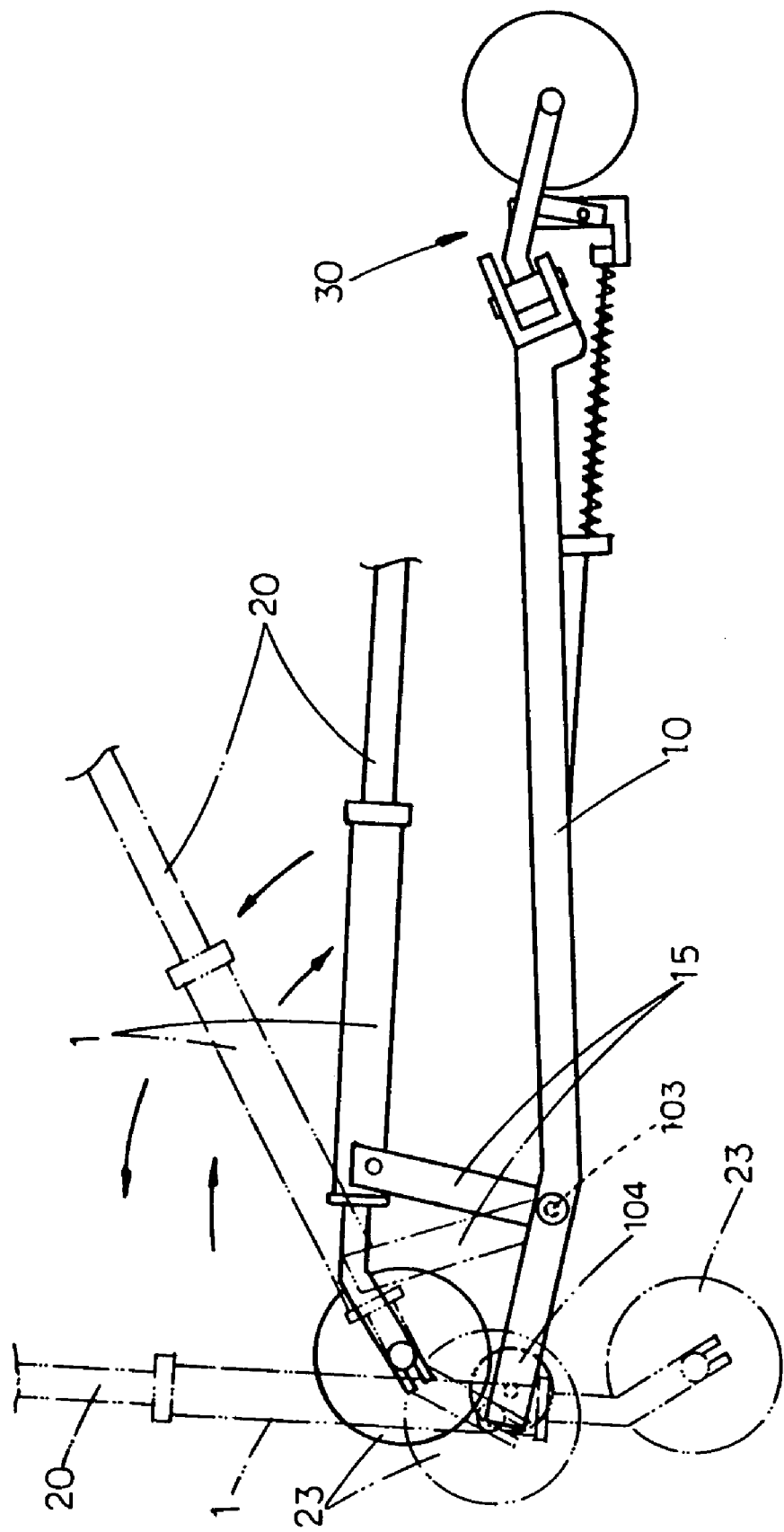
FIG. 8 is a schematic view of unfolding and folding statuses of the invention.

Please refer to detail description of FIG. 5 and FIG. 6 in advance; they clearly show that the improved scooter of the present invention mainly includes: frame 1, left and right holding rods 10, stand rod 20, left and right rear-wheel sets 30, left and right brake sets 40, front wheel 23, and left and right treadles; wherein, just like a conventional scooter, said stand rod is pivotally fitted on frame 1; handle 20 and single front wheel 23 are respectively set on the upper end and lower end of said stand rod 20; said left and right treadles are respectively set on said two holding rods 10; brake blocks 401 are respectively set on said left and right brake sets 40 to correspond with each of the said rear wheels 302 of two said rear-wheel sets 30; brake process can be proceeded on rear wheel 302 via brake line 402 and brake handle 403. The improvements of the present invention are as follows:

The front ends of said left and right holding rods 10 fixed on frame 1 coupled with said rear-wheel sets 30 are respectively set on the rear end of left and right holding rods 10 at a freely swaying status; wherein, the front ends of said two holding rods 10 is pivotally fitted on position rack 15 of frame 1 via pivot 103 and locking piece 104 (shown as FIG. 7) to enable scooter to proceed actions of unfolding and folding. Loosen locking piece 104 to unfit holding rod 10 from position rack 15 of frame 1, shown as FIG. 8, and then position rack 15 of frame 1, frame 1 and stand rod 20 can activate folding and unfolding with pivot 103 as a hub point. After being unfolded, frame 1 can be fitted on holding rods 10 and position rack 15 of frame 1 via locking piece 104 to achieve stable positioning effect.

Figure 9:
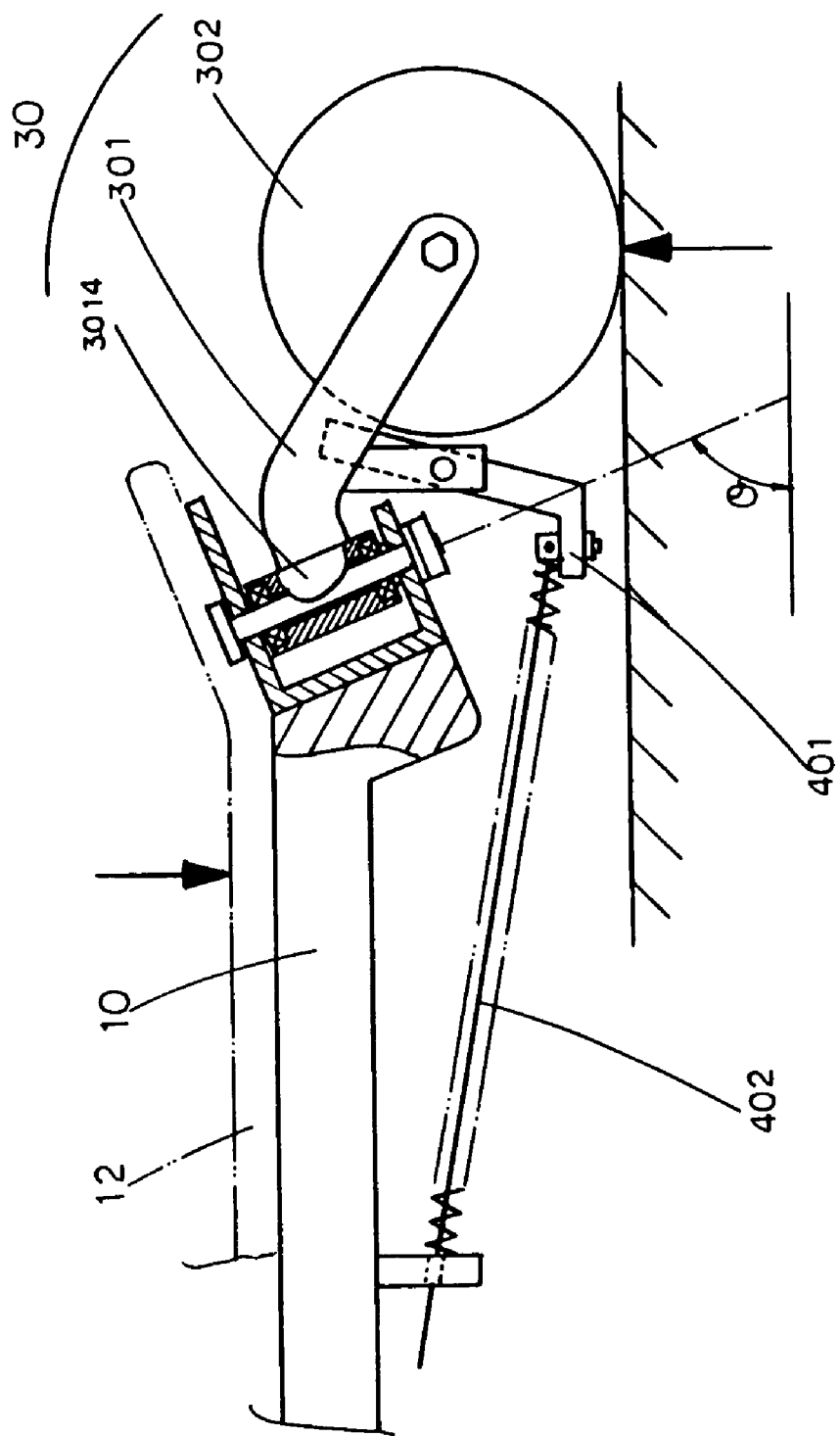
FIG. 9 is a schematic view of the rear-wheel set fitted on real end of holding rod.

Furthermore, referring to FIG. 9, since turning pivot piece 3014 of rear fork 301 of rear-wheel set 30 is slantingly and pivotally set on rear end of holding rod 10, when operator's feet stamping on treadle 12 to exert strength downward on holding rod 10 and press on rear wheel 302 via turning pivot piece 3014 of rear fork 301 and rear fork 301, the upward counterforce of the strength enforced on rear wheel 302 will make use of the slanting and pivotally fit of the turning pivot piece 3014 to automatically drive rear wheel 302 to proceed the returning action of making the wheel face forward, and, furthermore, to enable rear wheel 302 to more turn and move smoothly at any time.

Upon aforesaid description, in order to achieve the best and most smooth automatic-returning-effect of said rear wheel 302, the angle θ of turning pivot piece 3014 of rear fork 301 is slantingly and pivotally set on holding rod 10 preferably be at 65~70 degree.

Figure 10:
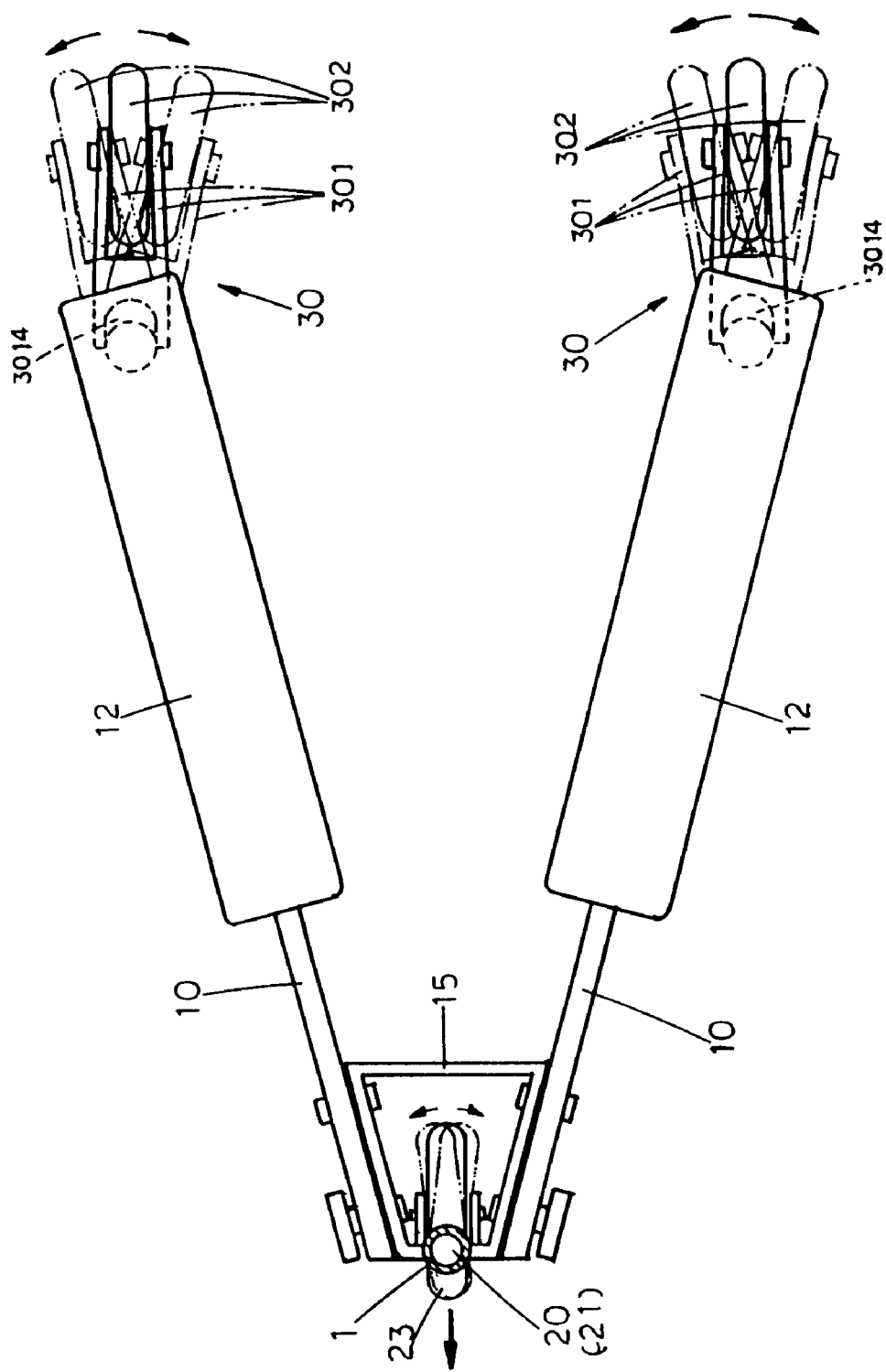
FIG. 10 is a schematic view of operation status prior to the scooting of the invention.
Figure 11:
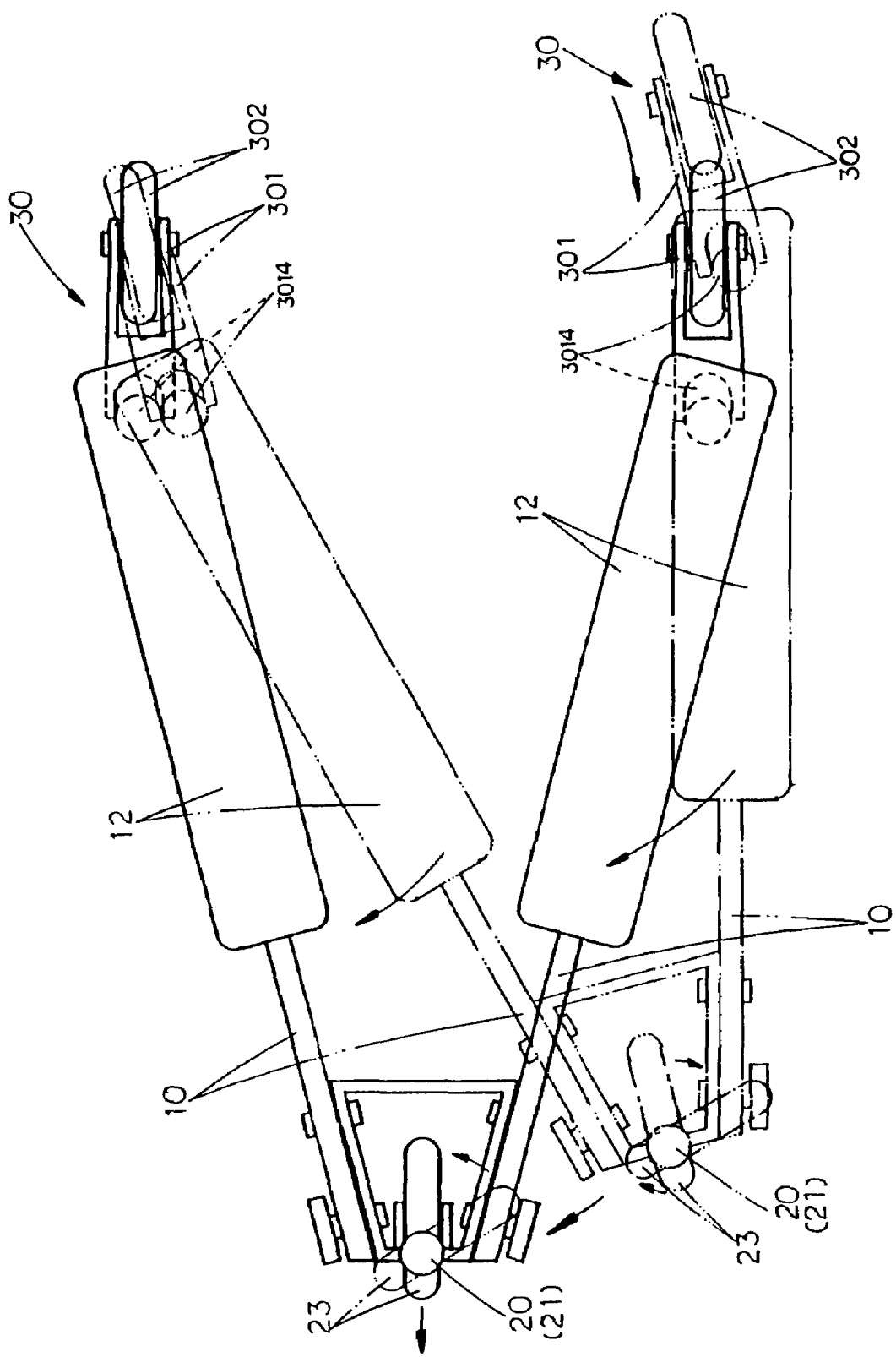
FIG. 11 is a schematic view (1) of operation status upon scooting forward and making a turn of the present invention.
Figure 12:
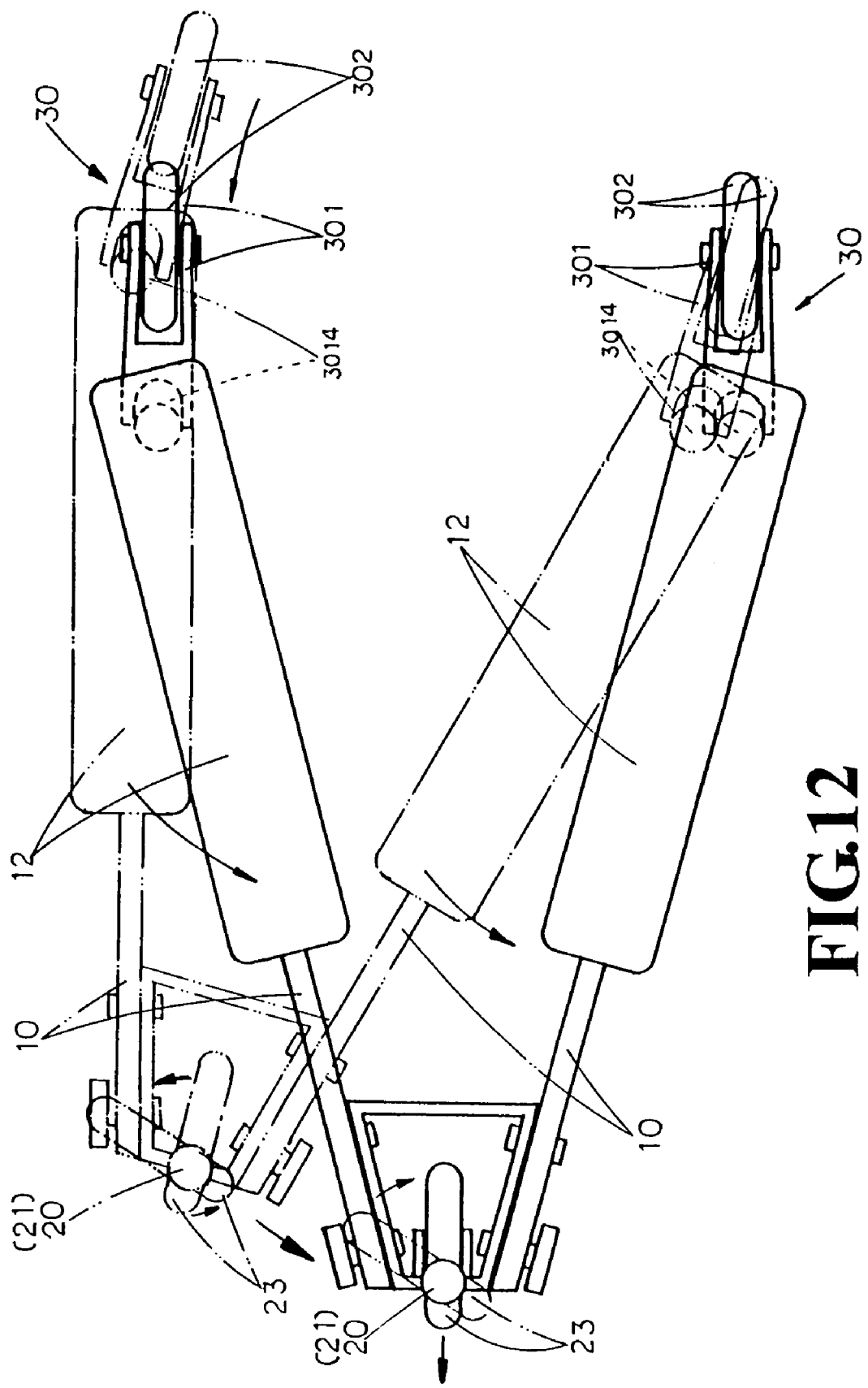
FIG. 12 is a schematic view (2) of operation status upon scooting forward and making a turn of the invention.

Referring to FIGS. 10, 11, and 12, since the front ends of said two holding rods 10 are fixed on said frame 1, and said front wheel 23 set on the lower end of stand rod 20 triangular supports scooter body along with said two rear-wheel sets 30 are respectively set on the left and right holding rods to enable scooter body to sway left and right; said two rear-wheel sets 30 can activate automatic returning free swaying action. The operator's feet stamp on treadles 12 of said two holding rods 10 and his hands hold handle 21 of stand rod 20, and his feet can exert strength on treadles 12 reciprocally or synchronously to drive left and right holding rods 10, stand rod 20 and handle 21 to sway leftward and rightward, to directly drive left and right rear-wheel sets 30 to sway leftward and rightward to move forward at a S-shaped pathway, and the scooter scoots. In other words, making use of operating said two holding rods 10 to sway leftward and rightward to drive rear wheel 302 of said two rear-wheel sets 30 to sway leftward and rightward to move at a S-shaped pathway. Hence, the operator, will thereby be assisted while holding handle 21 with his hands, only need to reciprocally or synchronously exert strength by his feet just like what players do in a skating sport, or sway his bottom, waist or body leftward and rightward to drive left and right rear-wheel sets 30 simply and easily. Upon aforesaid actions, the scooter can be driven forward smoothly. The operator not only can enjoy speeding—feeling from the scooter's smooth scooting, but also achieve the effect of whole-body exercise upon simple and safe operation. Since the operation of scooter of the present invention is not only very simple and also will provide variable, smooth and elegant operation posture, fun and recreation have been increased on the operation. The expected purpose and effect of said sport will be easier to achieve.

Upon foregoing description, since said rear-wheel sets 30 can sway freely to correspond the direction of strength exerting by feet, and to drive the wheel face of said rear wheel 302 to act automatic returning action and move forward at a S-shaped pathway via swaying action. Therefore, under the situation of the forward-moving resistance of said two rear wheels 302 having been decreased effectively by aforesaid reasons, the scooter will scoot more smoothly.

Upon foregoing description, basing on the requirement of practical operation, operator can also turn around handle 21 along with turning around his body to turn around stand rod 20 and front wheel 23 for making use of front wheel 23 to move the scooter forward via swaying at a S-shaped pathway.

In other words, apply the present invention will have at least the advantages set as follows:

1. Operation is simple, convenient and safe.
2. Operation can provide variable, elegant operation postures to make more fun, and expected effect and purpose of said sport will be achieved.
3. The scooter can scoot more smoothly and the operator can enjoy speeding feeling, and the operation effect of fun and recreation can be achieved.
4. The scooter can be folded and unfolded as needed, and the effect of convenience and space-saving can be achieved.

While the description of present invention is made in connection with what is considered the most practical and preferred embodiments, it is understood that this invention is not limited to the disclosed embodiments but intended to cover various arrangements included within the spirit and scope of the broadest interpretations and equivalent arrangements.

What is claimed is:

1. An improved scooter, comprising:
    a frame, a pair of left and right holding rods connected to said frame, a stand rod mounted in said frame, left and right rear-wheel sets having respective left and right rear wheels rotatable with respect to said respective left and right holding rods, a pair of left and right brake sets coupled to said respective left and right holding rods a front wheel rotatably coupled to said frame a pair of left and right treadles mounted to said respective left and right holding rods said stand rod being pivotally set on the frame, a handle and said front wheel being respectively set on an upper end and lower end of said stand rod, said left and right holding rods being fitted on the frame; said left and right treadles being respectively set on said left and right holding rods, said left and right rear-wheel sets being rotatably coupled to respective left and right fork members, each of said left and right fork members having a pivot member on one end for pivotal displacement with respect to a respective holding rod and rotatably coupled to said respective left and right rear wheels, each said pivot member of said respective left and right fork member is slantingly and pivotally fitted on the rear ends of said respective left and right holding rods, a pair of brake blocks respectively set on said left and right brake sets for acting upon each of the said rear wheels of said left and right rear-wheel sets wherein a braking operation is actuated through a brake line and brake handle mounted to said stand rod, said left and right holding rods having front ends which are fixed on the frame, said rear-wheel sets being respectively set on a pair of rear ends of said left and right holding rods for permitting free sway.

2. The improved scooter as claimed in claim 1, wherein an angle of the pivot member slantingly and pivotally set on the holding rod will be within the angle range of 65-70 degrees.

3. An improved scooter as claimed in claim 1, wherein said frame has a positioning rack, and the front ends of the left and right holding rods are pivotally set on the positioning rack through a rack pivot piece and fixed by a locking piece.

* * * * *